(12) United States Patent
Donaldson et al.

(10) Patent No.: US 7,793,742 B2
(45) Date of Patent: Sep. 14, 2010

(54) OFF ROAD VEHICLE APPARATUS AND METHOD

(75) Inventors: David Donaldson, Fairview, IL (US); John LaReau, Fairview, IL (US)

(73) Assignee: Cool2, Inc., Fairview, IL (US)

( * ) Notice: Subject to any disclaimer, the term of this patent is extended or adjusted under 35 U.S.C. 154(b) by 0 days.

(21) Appl. No.: 12/027,054

(22) Filed: Feb. 6, 2008

(65) Prior Publication Data
US 2008/0142286 A1 Jun. 19, 2008

Related U.S. Application Data

(63) Continuation of application No. 10/999,836, filed on Nov. 30, 2004, now abandoned.

(51) Int. Cl.
*B62D 11/02* (2006.01)
(52) U.S. Cl. .............. 180/6.48; 180/6.54; 280/124.111; 280/400
(58) Field of Classification Search ................ 180/6.48, 180/6.54, 242, 308; 280/400, 124.111
See application file for complete search history.

(56) References Cited

U.S. PATENT DOCUMENTS

| | | | | | |
|---|---|---|---|---|---|
| 2,737,903 | A | * | 3/1956 | McCormick | 105/4.1 |
| 3,292,943 | A | * | 12/1966 | Crockett | 280/104 |
| 3,303,901 | A | * | 2/1967 | Schou | 180/6.2 |
| 3,426,720 | A | * | 2/1969 | Enos | 440/12.66 |
| 3,563,329 | A | * | 2/1971 | Licari | 180/12 |
| 3,583,512 | A | * | 6/1971 | Praddaude | 180/306 |
| 3,635,302 | A | * | 1/1972 | Rogers et al. | 180/233 |
| 3,810,513 | A | * | 5/1974 | Spiller et al. | 172/114 |
| 3,900,075 | A | * | 8/1975 | Chichester et al. | 180/6.3 |
| 3,910,369 | A | * | 10/1975 | Chichester et al. | 180/6.32 |
| 4,079,955 | A | * | 3/1978 | Thorpe et al. | 280/474 |
| 4,249,629 | A | * | 2/1981 | Hutt | 180/418 |
| 4,290,623 | A | * | 9/1981 | Bowman et al. | 280/400 |

(Continued)

FOREIGN PATENT DOCUMENTS

FR 2 546 470 A 11/1984

(Continued)

OTHER PUBLICATIONS

International Search Report for PCT/US2005/043021 filed Nov. 29, 2005.

*Primary Examiner*—Lesley Morris
*Assistant Examiner*—Maurice Williams
(74) *Attorney, Agent, or Firm*—Robert C. Haldiman; Husch Blackwell Sanders LLP

(57) ABSTRACT

A ground engaged vehicle includes a front portion and a rear portion joined by an articulation. The articulation rotates around a longitudinal axis. An engine drives a hydrostatic pump which drives four hydrostatic motors, each of the hydrostatic motors in operative engagement with one of four wheels. The wheels are on wheel mounts, each of the wheel mounts having a vertical axis around which one of the four wheels with one of the hydrostatic motors is turnable. A steering system turns the two wheels of the front portion in a first direction and the two wheels of the rear portion in an opposite direction. The steering system is powered by the hydrostatic pump. A pedal control system has a first pedal controlling driving the vehicle in a forward direction and a second pedal controlling driving the vehicle in a rearward direction.

14 Claims, 14 Drawing Sheets

U.S. PATENT DOCUMENTS

| | | | |
|---|---|---|---|
| 4,322,899 A * | 4/1982 | Clune | 37/352 |
| 4,982,799 A * | 1/1991 | Fujimoto et al. | 172/2 |
| 5,048,638 A * | 9/1991 | Duncan et al. | 180/307 |
| 5,245,882 A * | 9/1993 | Kallenberger et al. | 74/405 |
| 5,353,988 A * | 10/1994 | Gallenberg | 239/164 |
| 5,368,121 A * | 11/1994 | Priefert | 180/209 |
| 5,427,195 A * | 6/1995 | Paul et al. | 180/308 |
| 5,806,870 A * | 9/1998 | Hull et al. | 280/400 |
| 5,810,106 A * | 9/1998 | McCoy | 180/243 |
| 5,823,284 A * | 10/1998 | Hoar et al. | 180/240 |
| 6,098,738 A * | 8/2000 | White | 180/308 |
| 6,241,416 B1 * | 6/2001 | Klarer | 403/113 |
| 6,250,663 B1 * | 6/2001 | Maloy | 280/492 |
| 6,357,232 B1 * | 3/2002 | Strashny | 60/431 |
| 6,631,773 B1 * | 10/2003 | Walker | 180/24.09 |
| 6,684,974 B1 * | 2/2004 | Ulschmid | 180/414 |
| 6,695,328 B2 * | 2/2004 | Cope | 280/124.111 |
| 2001/0033067 A1 * | 10/2001 | Vangsgard | 280/400 |
| 2004/0206403 A1 * | 10/2004 | Saitou et al. | 137/539 |

FOREIGN PATENT DOCUMENTS

| | | |
|---|---|---|
| GB | 17306 | 7/1913 |
| GB | 760 106 A | 10/1956 |

\* cited by examiner

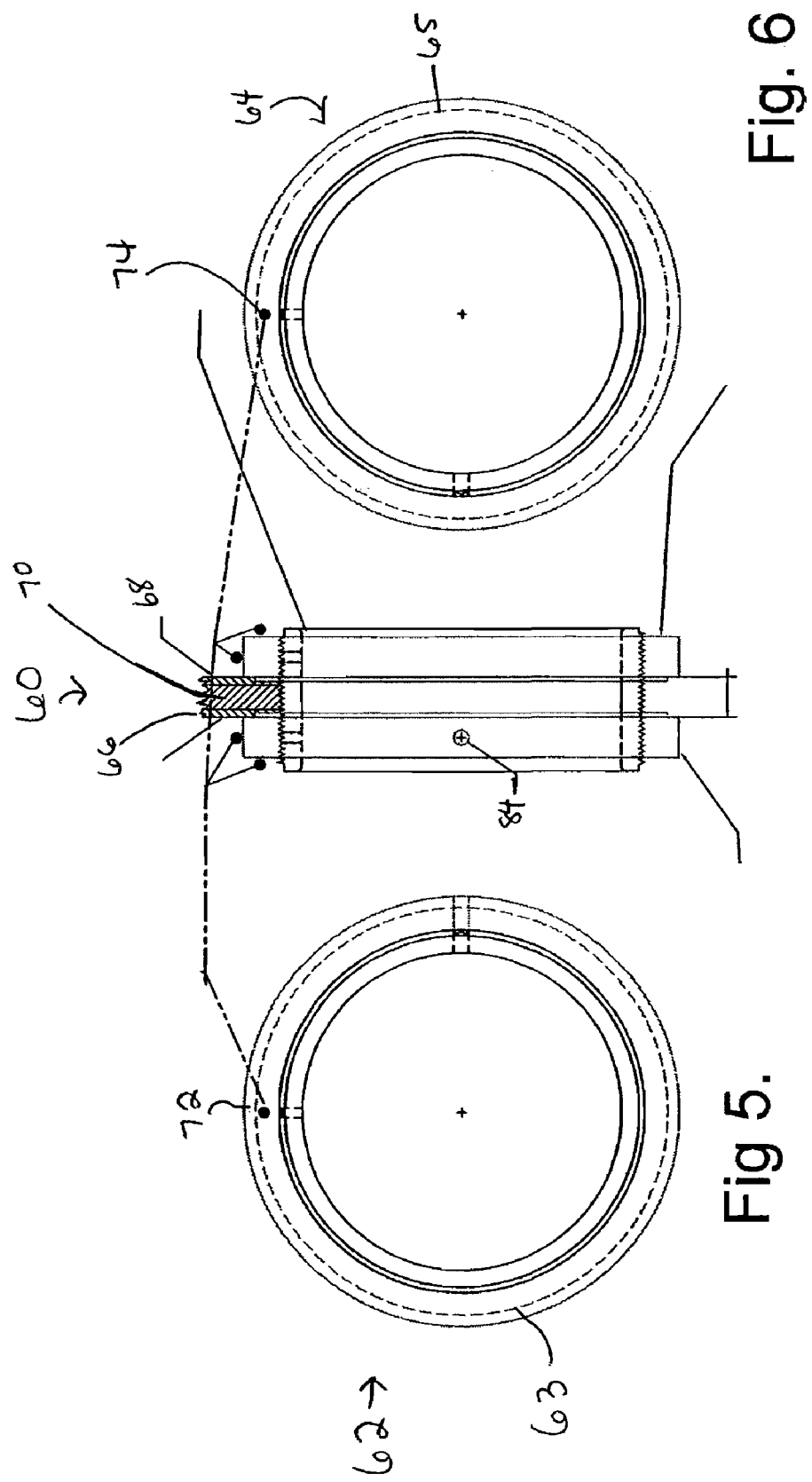

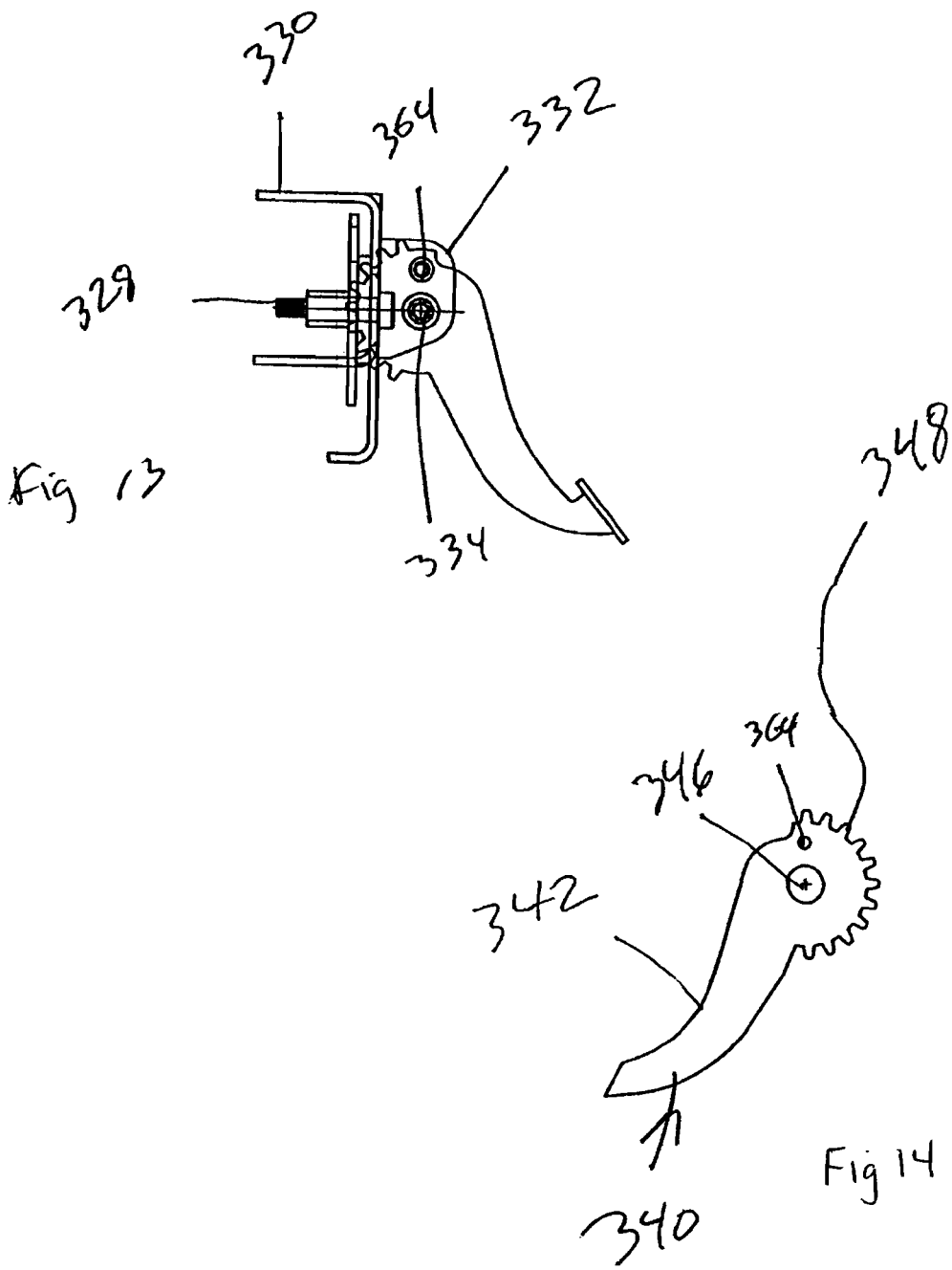

OFF ROAD VEHICLE APPARATUS AND METHOD

CROSS-REFERENCE TO RELATED APPLICATIONS

This application is a continuation of U.S. patent application Ser. No. 10/999,836 filed on Nov. 30, 2004.

STATEMENT REGARDING FEDERALLY SPONSORED RESEARCH

Not Applicable.

APPENDIX

Not Applicable.

BACKGROUND OF THE INVENTION

1. Field of the Invention

The field of this invention is in off road, ground engaged vehicles.

2. Related Art

Non-construction and non-agricultural off road vehicles include various classes of designs including what are popularly known as "all terrain vehicles" and "utility vehicles." These types of off road vehicles face a variety of challenges in covering terrain. Most of these challenges are related to obstacles, objects and/or soft ground in the path of travel that can stop the vehicle's progress. Meeting and overcoming these obstacles is more successful to the extent that the following characteristics can be optimized: lowering the center of gravity; increasing power; maintaining traction; maintaining stability; maximizing ground clearance; maximizing maneuverability; and, when necessary, easing maintenance. As always, controlling cost is a continuing need in the art.

Most vehicles in the all terrain vehicle (ATV) and utility vehicle (UV) classes have suspensions systems similar to the familiar automobile suspension systems and constructed and arranged with springs and shock absorbers and the like. The design of said systems allows an individual wheel to travel vertically relative to the rest of the vehicle in order to ride over an obstacle while the rest of the vehicle proceeds past the obstacle. The problem with such suspension systems is that the vehicle body as a whole does not increase its ground clearance when it is most needed—when a large obstacle is to be overcome. Hence, when an obstacle is large enough, a sprung wheel may flex vertically to accommodate it, but the ground clearance of the body of the vehicle will still be stopped by the obstacle. There is a need in the art for a vehicle that will increase the ground clearance of its entire body in order to overcome larger or rougher obstacles.

Further, during the time that an individual sprung wheel is flexing vertically to avoid an obstacle, traction is lost with that wheel, and the constant application of power to the ground by that wheel is lost. Hence, there is also a need in the art for an off road vehicle that continues to apply constant traction and power to the ground while obstacles are overcome.

Prior art ATVs and UVs, having conventional drive systems with the mechanical linkages between an internal combustion engine and the wheels, typically including a transmission and differential, further complicating the constant delivery of power and traction to the ground by the wheels in rough terrain. There is a need in the art for a drive system that increases power, maintains traction through all four wheels at all times and affords higher torque in a slower wheel spin.

There is a further need in the art for a vehicle whose maneuverability is maximized in order to travel in and through narrow spaces between insurmountable obstacles. Accordingly, there is a need in the art for a vehicle with four wheel steering.

Hydrostatic drive and hydrostatic motors mounted directly on the wheels are known, but not generally in off road vehicles. Skid steers and fork trucks used in warehousing are often driven by hydrostatic motors mounted directly to individual wheels. The advantage of such drive systems is very low wheel spin rates and the maintenance of high torque at extremely low speeds, thereby allowing increased maneuverability in close quarters, especially while maneuvering a load. It is not known to apply pure hydrostatic drive technology to off road vehicles. Accordingly, there is a need in the art for the maximized maneuverability and torque at low speeds afforded by hydrostatic drives as applied here thereto unapplied to off road vehicle technology.

SUMMARY OF THE INVENTION

It is in view of the above problems that the present invention was developed. The present invention is an off road vehicle having a front portion and a rear portion connected by an articulating joint that rotates around an axis that is longitudinal to the vehicle and parallel to its direction of travel. This articulation allows front and/or rear portions to roll, that is turn about the longitudinal axis, in order to meet and overcome an obstacle in its path. In so doing, the rolling motion not only raises the wheel first contacting the obstacle, but also raises the front or rear portion of the vehicle, thereby raising the vehicle's ground clearance and allowing it to traverse higher obstacles than prior art vehicles.

The articulation system also acts in a manner that allows the elimination of conventional suspension systems. Therefore, all four wheels are maintained in driving ground contact to a greater extent than prior art vehicles.

The off road vehicle of the present invention has a hydrostatic drive system. A hydrostatic pump is driven by an internal combustion engine. A flow divider directs the flow of fluid through a hydraulic system in order to drive each of four hydrostatic motors. In low gear power is directed to the wheels in diagonal pairs. The four hydrostatic motors are mounted directly on each of four wheels, one preferred embodiment having four wheels.

The present invention has a four wheel steering system. Two wheels are mounted side by side on the front portion of the vehicle. These turn in unison as controlled by a hydraulic piston and cylinder having a two way drive. A simple lever constructed and arranged with each wheel mount turns each wheel. The levers turn in unison as one of the cylinders or the piston is connected with each lever. The same system is applied to the rear portion of the vehicle. However, the front and rear systems are coordinated such that turning the front wheels in a first direction affects the turning of the rear wheels in the opposite direction. Thereby, the turning radius of the vehicle is greatly reduced and maneuverability increased.

The present invention includes a novel wheel mounting system. A vertical pinion is journaled into a solid, non-removable mount fixedly attached to the body of the vehicle. The wheel and the hydrostatic wheel motor are attached to the bottom of the journaled pinion such that they can turn around a vertical axis. The top of the journal pinion is fixedly attached to a lever, the other end of the lever being turned by the extension or retraction of one of the piston or cylinder of the steering linkage.

The control system of the present invention includes a novel pedal arrangement. Each pedal is constructed to receive a linear motion from an operator's foot. A slotted plate in the body of the vehicle receives the linear motion of the pedal shaft, the operation of the pedal is converted to an angular rotation of the slotted plate. This in turn controls power delivered to the hydrostatic drive system, and therefore controls the speed and progress of the vehicle. The mounted control system of the present invention includes a first pedal for controlling the vehicle in a forward direction and a second pedal for controlling the vehicle in a rearward direction.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 5 is a disassembled longitudinal view of the articulation between the front and rear portion in a first position;

FIG. 6 is a disassembled longitudinal view of the articulation between the front and rear portion in a second position;

FIG. 7 is a side view of the articulation;

FIG. 13 is a side view of the pedal assembly;

FIG. 14 is a side view of a pedal;

DETAILED DESCRIPTION OF THE PREFERRED EMBODIMENTS

Figure 1:
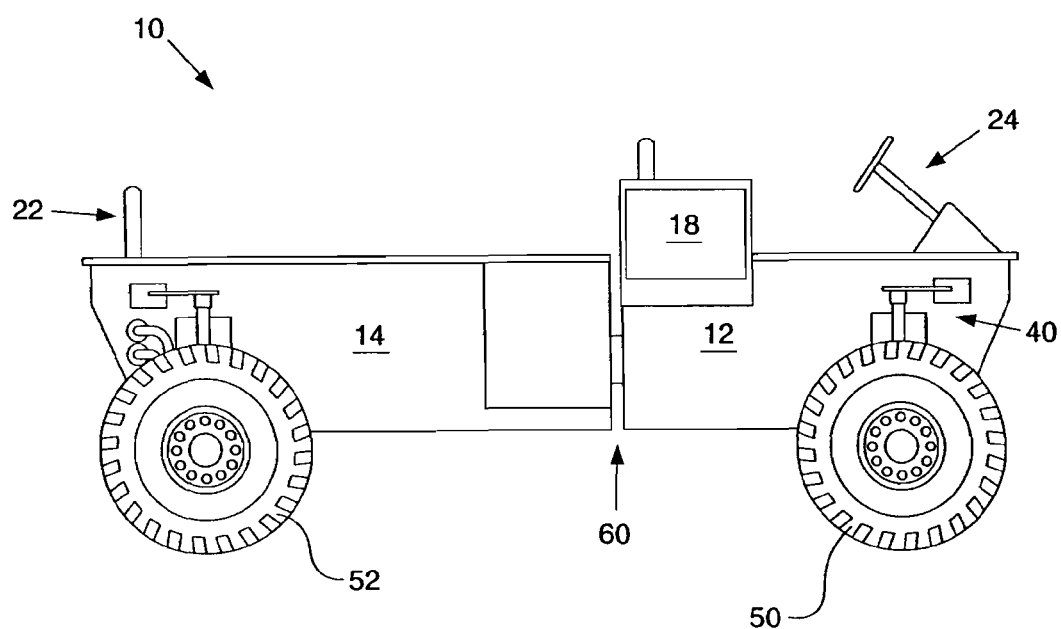
FIG. 1 is side view of the off road vehicle of the present invention.

The following description of the preferred embodiment(s) is merely exemplary in nature and is in no way intended to limit the invention, its application, or uses.

Referring to the accompanying drawings in which like reference numbers indicate like elements, the off road vehicle 10 of the present invention is comprised of a front portion 12 and a rear portion 14. The two portions are separated by an articulation 60. Two wheels 50 are mounted to the front portion on either side. Two wheels 52 are mounted on the rear portion on either side. Each of the four wheels is held in place and controlled through a mount 40. In the depicted embodiment, an engine and hydrostatic pump are housed in the front section, which includes an exhaust port 18 for the engine. (An intake manifold port is on the opposite side of the vehicle.)

The interiors of the front portion 12 and rear portion 14 may be variously configured. In the depicted embodiment, they include seats, the seats having back rests 22 and a control panel having a steering wheel 24 in the front portion.

Figure 2:
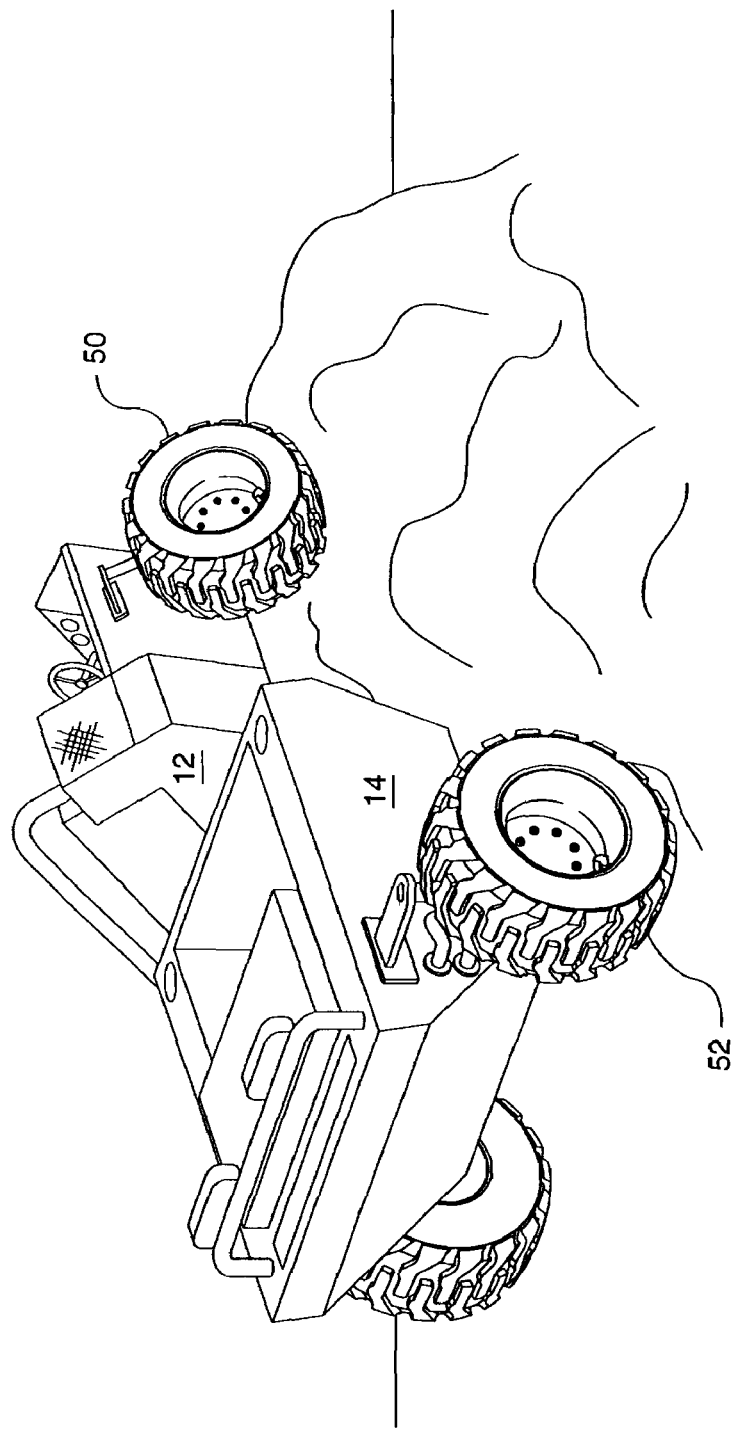
FIG. 2 is a perspective view of the off road vehicle.

FIG. 2 is a perspective view of the off road vehicle shown encountering and overcoming an obstacle. As is apparent from FIG. 2, the obstacle is overcome by the articulation between the front portion 12 and the rear portion 14 rolling around its longitudinal axis thereby allowing the right front wheel 50 to elevate over the obstacle. In the process, the entire front portion is correspondingly lifted, thereby increasing its functional ground clearance at the point where it is needed; over the obstacle. Upon the front wheel and front portion descending on the far side of the obstacle, the articulation will allow the front portion to rotate back downwards, which would be clockwise in the depicted embodiment. When right rear wheel 52 encounters the same obstacle, the articulation will allow the rear portion 14 to roll up along the longitudinal axis of the articulation, which is counterclockwise in the depicted embodiment, such that right rear wheel 52 may elevate over the obstacle. Of course, rear portion 14 will also be elevated as right rear wheel 52 elevates, thereby increasing its useful center of gravity simultaneously as well.

Articulation

FIGS. 5, 6, 7 and 8 depict the details of the articulation between the front portion and the rear portion. The articulation 60 is composed of a forward collar 62 and a rear collar 64. These collars are substantially equivalent mirror images of one another. Their inner diameter is threaded. Each includes a step creating a flange 63 and 65. This flange corresponds to a through hole provided for it in the back wall hull plate of the front portion 12 and the front wall hull plate of the back portion 14. (In the depicted embodiment, the vehicle is largely constructed of welded plate steel.) The rear plate 66 of the front portion 12 and the front plate 68 of the rear portion 14 appear in cutaway side view FIG. 7. Each of the collars 62 and 64 are fixedly attached to the plates 66 and 68.

Being an off road vehicle, the present invention is designed for operation in dirty environments. Accordingly, in order for the articulation to be a durable, low maintenance functional component, novel structure has been created to prevent foreign material such as dirt from degrading its performance. In the depicted embodiment, this is achieved with a bushing or plastic spacer 70. The plastic spacer 70 is dimensioned and constructed to closely cooperate with the hull plates 66 and 68.

The center tube 80 of the articulation is threaded on its outside diameter with threads that correspond to the threaded inside diameters of collars 62 and 64. The axial length of the center tube 80 exceeds somewhat the axial combined depth of the collar 62 and 64 when mounted in place with the plastic spacer 70 and the hull plates 66 and 68. The threads of center tube 80 are truncated at their peaks, in order to allow the entire articulation to be greased in order to maintain a water seal. The center tube 80 (see FIG. 8) includes a hole 82 dimensioned to correspond to a hole 84 in one or the other of the collars. In the depicted embodiment, hole 84 is in the front collar 62. The threaded holes 82 and 84 will receive a bolt for fixedly mounting center tube 80 during assembly.

During a fabrication, collar 62 and 64 also have placement or "timing" marks 72 and 74 placed on them. In the depicted embodiment, these marks are machined into the collars. In machining collar 62 and 64, the timing marks are coordinated with the threads such that screwing the center tube 80 into one of the collars advances the center tube 80 a preconfigured distance in an axial direction.

In assembly of the articulation, each collar 62 and 64 is fixedly attached to its corresponding hull plates 66 and 68. The timing marks 72 and 74 are aligned. Next the center tube 80 is threaded through its corresponding through hole in plastic sheet 70. An unthreaded cooperation between center tube 80 and plastic sheet 70 remains within the scope of the present invention. This assembly is then screwed into the front collar 62 until hole 82 in center tube 80 is correspondingly aligned with hole 84 in front collar 62. Thereupon the center tube 80 is fixed in its relation to front collar 62 by screwing a bolt (not shown) through holes 82 and 84. Next the rear hull plate and rear collar 64 are brought into assembly with center tube 80. Rear collar 64 is screwed into place. The timing mark of the rear collar 64 is brought into correspondence with the timing mark of the front collar 62. Thereafter the hulls are properly aligned in a neutral and level position and the rear collar 64 is fixed to permanently fixedly attach to the rear hull plate 68. Obviously, the order of assembly could be reversed with regard to front and rear without changing the effectiveness of the assembled component or departing from the scope of the present invention. In the depicted embodiment, since the engine is mounted in the front portion 12, the rear portion which will threadingly articulate with the fixed center tube 80 through collar 64, will have a grease nipple mounted on it for maintenance.

By carefully aligning the collars and threaded tube between them, the proper preselected tolerance between the outer surfaces of the plastic sheet 70 and the facing surfaces of the rear plate 68 and front plate 66 are maintained. Stops may be affixed in any appropriate position between the front and rear portions in order that rotation of the articulation be controlled. In the depicted embodiment, maximum roll around the longitudinal axis is 45°. Whether a useable range is thus limited and defined, or is unlimited in practical use, throughout the range of use rotation, the tolerances between the plastic sheet and the hull plates exposed to the contaminated working environment are maintained acceptably close. In the depicted embodiment, the tolerance is maintained at a gap of 0.04 inches or less between the plastic sheet surface and the surface of either plate.

The center tube 80 of the articulation has an inner diameter sufficient to allow passage therethrough of all the necessary hydraulic lines for the hydrostatic drive system. In the depicted embodiment, this inner diameter is approximately eight inches.

Mounts

Figure 3:
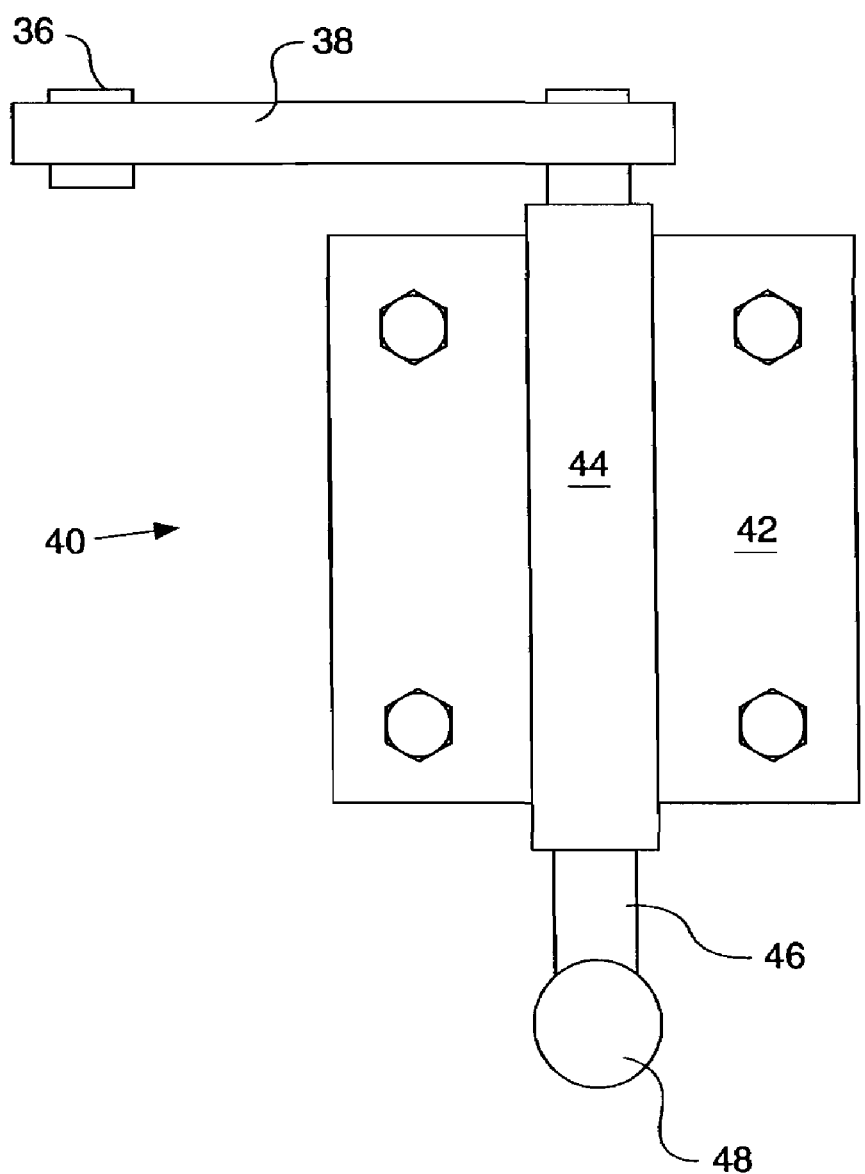
FIG. 3 is a side view of a wheel mount.
Figure 4:
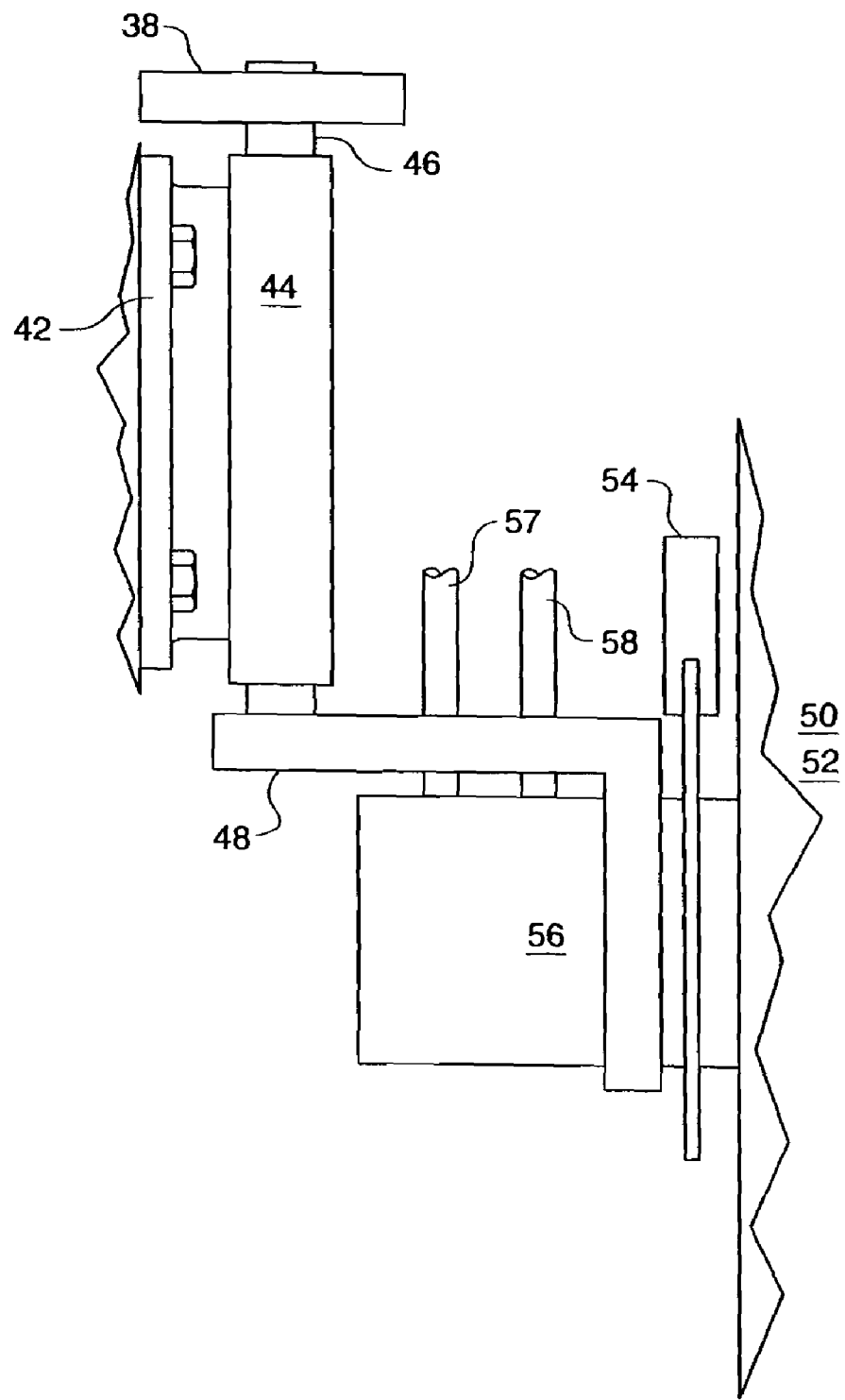
FIG. 4 is a longitudinal view of a wheel mount.
Figure 8:
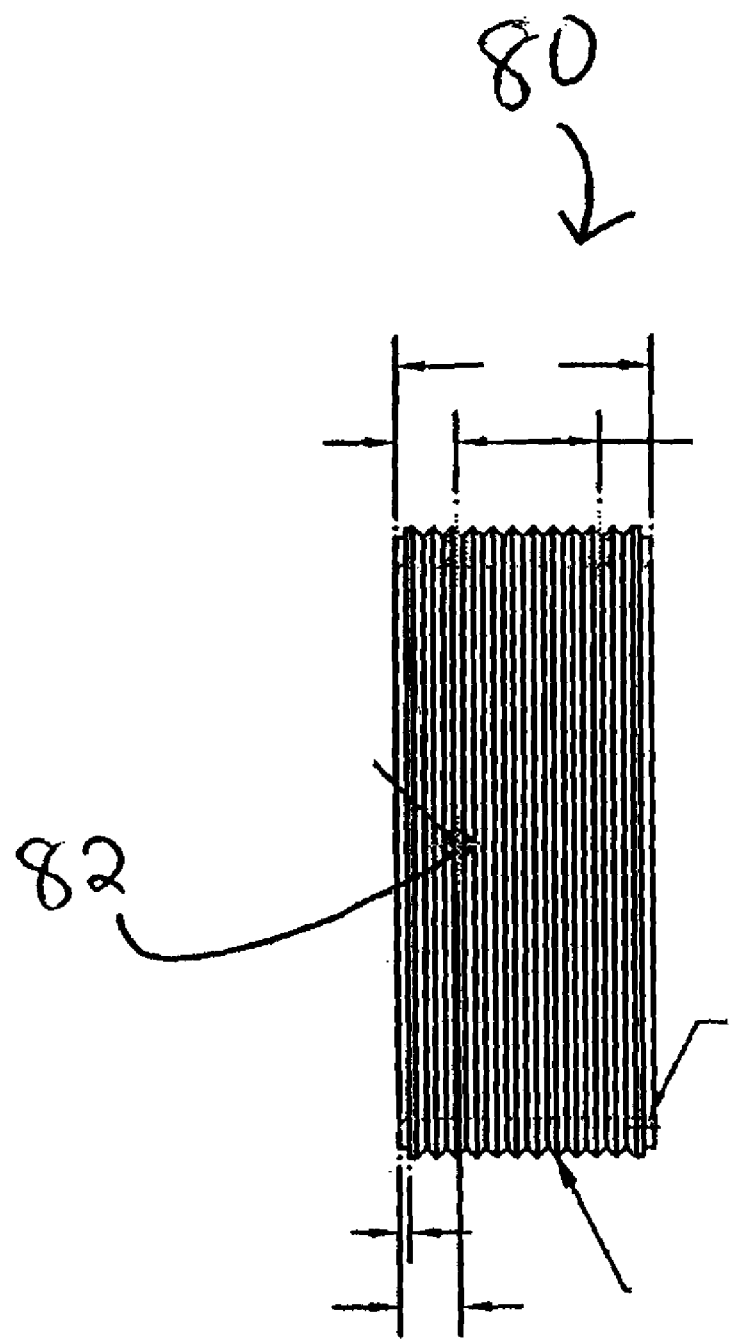
FIG. 8 is a side view of the inner shaft of the articulation.

The novel mounting arrangement of the off road vehicle is depicted in FIGS. 3 and 4. The mount assembly 40 is comprised of a mounting plate 42 on to which is fixedly attached a substantially vertically oriented cylinder 44. Through this cylinder is journaled a pinion or rod 46 with appropriate bushings, flanges or other mounting devices such that the rod 46 does not slide axially through cylinder 44, but may rotate freely within it. The rod 46 extends both above and below the extent of cylinder 44. Below the cylinder, vertical rod 46 is fixedly attached to an angled mounting bracket 48. The wheels 50 or 52 are mounted to the bracket 48 along with a disk brake assembly 54 and a hydrostatic motor 56. The hydrostatic motor is powered by hydrostatic system, which is connected to the hydrostatic motor 56 via hydraulic hoses 57 and 58. The disk brakes may be of any conventional design.

As is apparent from the drawings, rotation of the vertical rod 46 will turn the wheels 50, 52. In order to actuate such vertical turning, and thereby actuate steering, the top end of the vertical rod 46 is fixedly attached to a lever arm 38. At an opposite portion of the lever arm 38 from its attachment to the vertical rod 46 is a pivoting attachment 36. The pivoting attachment 36 is connected to a tie rod portion of a steering linkage (not shown). The tie rod extending or retracting turns the lever arm 38 and, with it, the vertical rod 46 and wheels 50, 52. As is more apparent in FIG. 1, the steering linkage is arranged transverse to the direction of travel of the overall vehicle, so that extension and retraction of the linkage would be laterally out from and back in towards the vehicle, which would be in and out of the page in FIG. 1. The steering linkage is described in greater detail below.

As is apparent from FIGS. 3 and 4, there is no conventional suspension system included in the mounting of these wheels. Instead, the action of the articulation between the front and rear portion is relied upon to provide suspension and responsiveness to road obstacles. Additionally, it is the part of the method of use of the apparatus of the present invention that tire pressure as used in the tires mounted on wheels 50 and 52 be maintained at a low level in order that the tires absorb the shock of smaller obstacles. In the preferred embodiment, six to eight pounds of pressure is maintained in all four wheels. Through these mechanisms durability is increased and costs reduced.

In one embodiment of this invention, maintenance is further simplified by the choice of wheel hubs. The hubs of the depicted embodiment may receive mounting of 15 inch wheels. This is a standard size wheel for an automobile. This is atypical of other ATV and UVs. Accordingly, if necessary, a wide range of standard automobile wheels can be used to replace a flat wheel in the event the off road vehicle is being used in a location inaccessible to more sophisticated maintenance and parts services.

Hydrostatic Drive System

Figure 9:
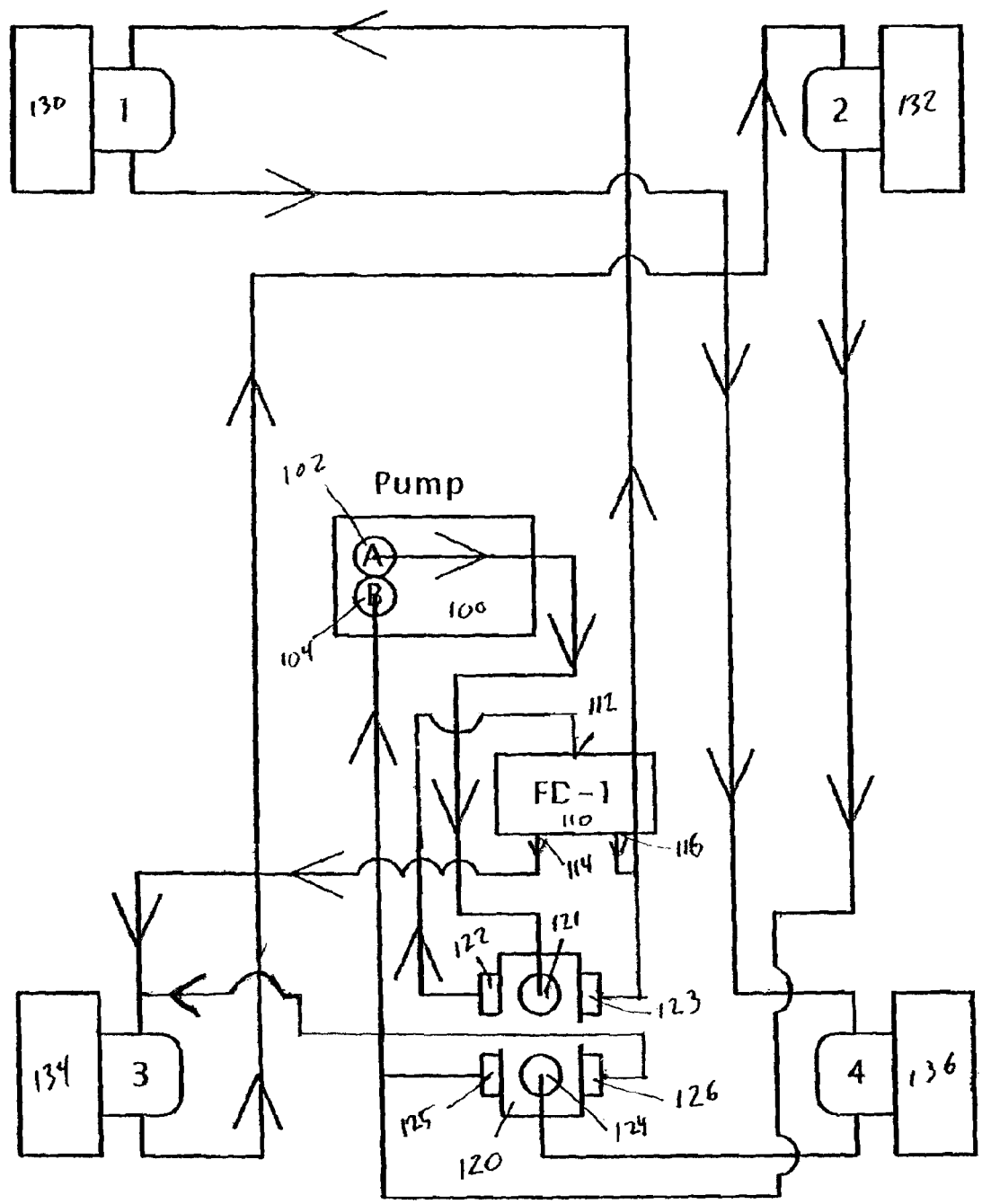
FIG. 9 is a schematic diagram of the hydrostatic drive system.
Figure 9A:
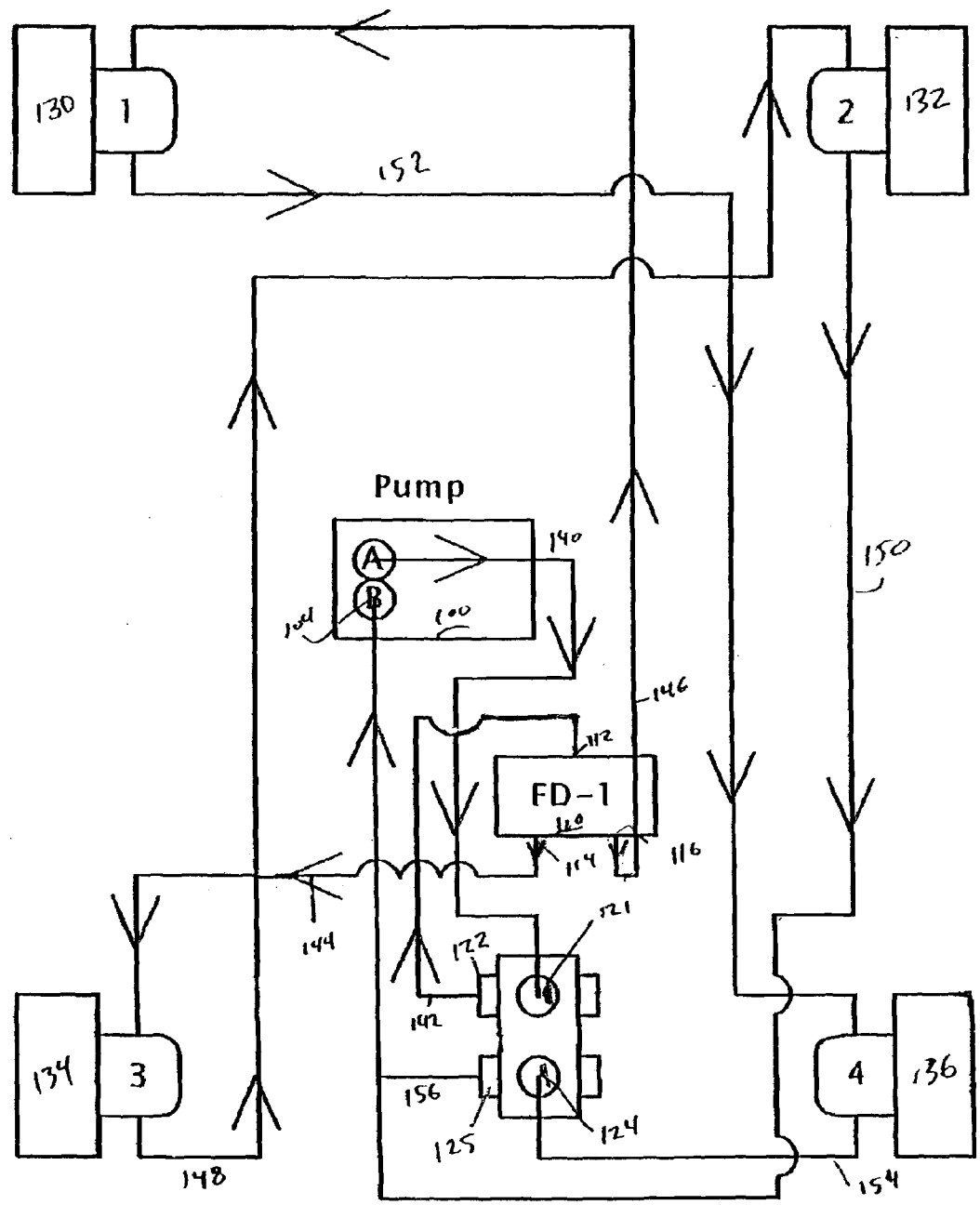
FIG. 9A is a schematic diagram of the hydrostatic drive system in low gear.
Figure 9B:
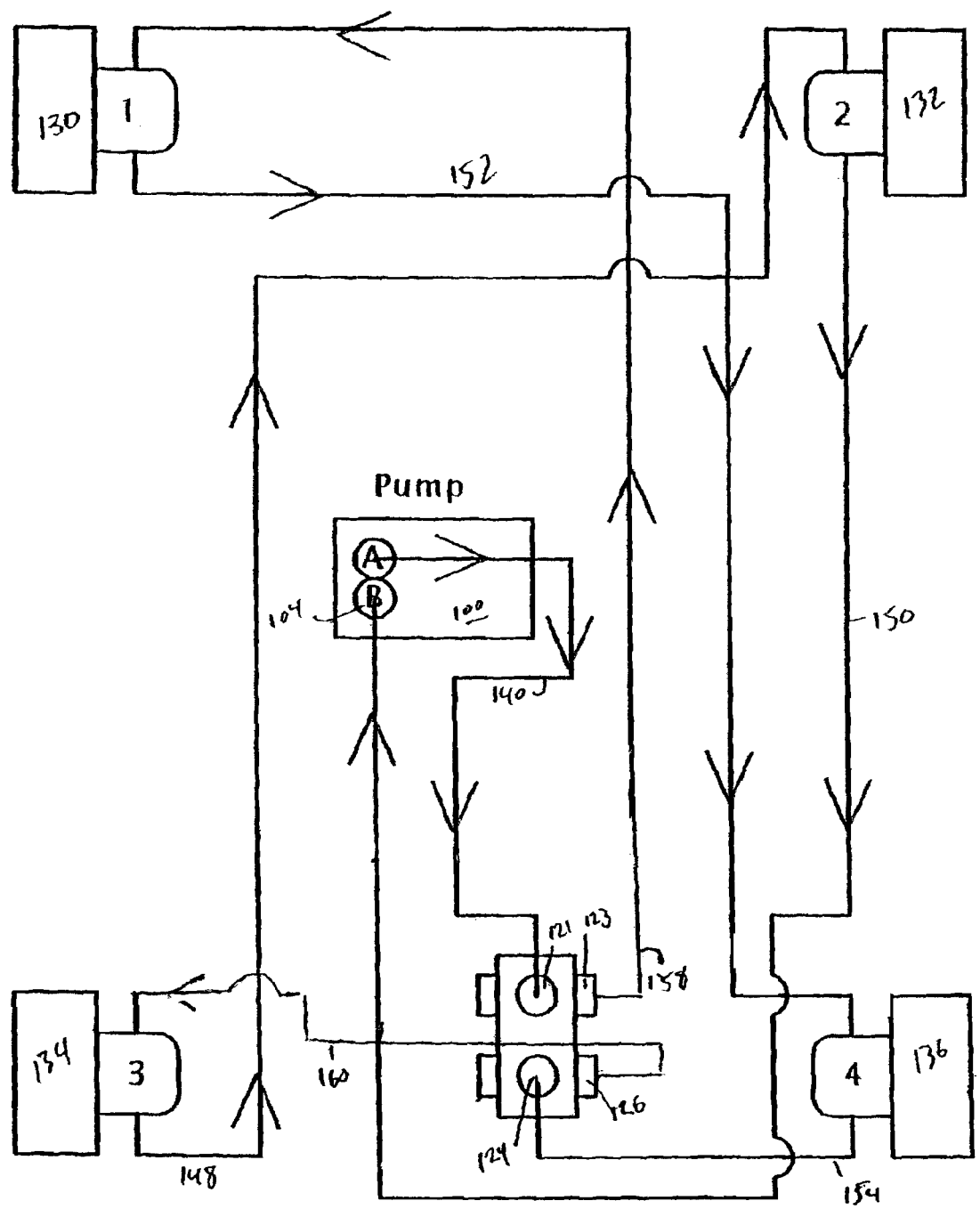
FIG. 9B is a schematic diagram of the hydrostatic drive system in high gear.

The hydraulic drive system of the off road vehicle is schematically represented in FIG. 9. FIG. 9 is a composite schematic of the entire system. For clarity, FIG. 9A depicts only the lines in use when the vehicle is in low gear and FIG. 9B depicts only the lines in use and the flow path when the vehicle is in high gear.

The primary components of the hydrostatic drive system are pump 100, flow divider 110, six-way valve 120, and four hydrostatic motors 130, 132, 134 and 136, each individually mounted to a wheel. The pump is an Oil Gear® brand Model PVWC L51611-672 closed loop variable displacement pump having a maximum capacity of 1.35 cubic inches per revolution and a maximum pressure 4,000 pounds, although in the depicted embodiment a relief valve 3,600 psi installed. The flow divider is a Barnes model 060203-1300636. In the depicted embodiment a six-way valve Cross® model V54 BUBF7 valve is used having 50 gallons per minute capacity. The maximum capacity of the system is 16 gallons per minute. A novel aspect of this invention is the over size capacity of the six-way valve, which is used to eliminate any restriction of flow at the valve in order to accommodate a high gear to be described below and in order to maintain a constant maximum delivery of power to the wheels in low gear. In place of a six-way valve, two three way valves may be used instead. The hydrostatic motors are Parker® model "Gerorotors" having a fixed displacement of 20.6 cubic inches and maximum torque of over 20,000 inch pounds. The selected motor is efficient at low flow rates. Other components may be used without departing from the scope of the invention. The salient characteristics of the components are described throughout herein.

The hydrostatic drive system may work in either forward or reverse. Each direction of travel will have a high gear and a low gear. When in a forward mode, the pump causes a direction of flow in a forward direction by hydraulic oil leaving port 102 and re-entering the pump at port 104. In order to operate in the reverse direction, the entire flow path is reversed, with hydraulic oil leaving the pump at port 104 and returning at port 102. Hence, all the capabilities of the high and low gear available in the forward drive mode are also available in a reverse drive mode.

The pump is driven by an internal combustion engine. In the depicted embodiment, this engine is a 27 hp Kohler model PA-CH740-0012.

The flow divider 110 has an intake port 112 and two output ports 114 and 116. Its internal configuration is known. It is a geared flow divider, causing an equal volume of fluid to exit both ports 114 and 116 simultaneously in at an equal flow rate.

The six-way valve 120 has two intake ports 121 and 124. It has four output ports 122, 123, 125 and 126. It has two working positions. One causes fluid to exit the valve at exit ports 122 and 125. In this position exit ports 123 and 126 are closed. In the second working position, fluid is output by the valve at ports 123 and 126, and output ports 122 and 125 are closed. In the depicted embodiment, the first position of the valve is used for low gear and a second position for high gear. The first position for low gear directs fluid flow through the flow divider and thereafter directs fluid flow in a novel path designed for the off road utility of this vehicle. In high gear, the second position of the six-way valve 120 is used and fluid follows a flow path that does not include the flow divider 110.

Constant power is delivered to all four wheels at all times by virtue of the fact that this is a hydrostatic drive system, and also by virtue of the fact that there is no slip clutch or differential in the drive system. However, the flow path further supplements power delivery by diagonally pairing the wheels, insuring power to the wheels having the most useful contact with the ground.

In the majority of circumstances, the off road vehicle will encounter obstacles in an asymmetrical fashion. That is, the single forward wheel will ride over an obstacle while the opposite forward wheel does not need to ride over the obstacle. Because of the use of the center articulation as a suspension system, in the majority of cases as one or the other front wheel rides over an obstacle, the other front wheel and the rear wheels will remain relatively flat on the ground and in good driving contact with it. After the vehicle has traversed the obstacle with its front wheel, the same side rear wheel will, in most cases, also ride over the obstacle. As this happens, the other rear wheel and the two front wheels will be in relatively flat and stable contact with the ground and in good driving engagement with it. Another relevant situation is both wheels on one side being on soft or slippery ground, like ice. In low gear, the hydrostatic drive system of the off road vehicle directs power to the wheels in diagonal pairs. This is done to maximize the delivery of useful power to the wheels as obstacles are traversed.

FIG. 9A depicts the flow path in low gear. Pressurized fluid leaves pump 100 through a first connected hydraulic hose 140. This fluid is directed into intake port 121 in six-way valve 120. In the valve's first position, this fluid is directed outwards through port 122 into and through hose 142 which carries the pressurized fluid flow into port 112 of flow divider 110. The flow divider 110 then directs the fluid out in equal volumes from its exit ports 114 and 116. From exit port 114, hose 144 transports pressurized fluid to a third wheel motor 134, and drives it. Thereafter, the fluid exits motor 134 and via hose 148 is directed to second motor 132. Hence motors 134 and 132 are a diagonal pair. After entering and driving second motor 132, this fluid is directed via hose 150 back to receiving port 104 and the pump 100.

The other diagonal pair of motors, 130 and 136 are driven with the pressurized fluid flow exiting the exit port 116 of flow divider 110. This is first through hose 146, which enters first motor 130. After the fluid has entered and driven first motor 130, it exits motor 130 through hose 152 and is transported to the diagonally paired fourth motor 136 and the fluid drives that motor. Thereafter the fluid exits motor 136 through hose 154 and reenters six-way valve 120 at intake port 124. This fluid is then directed out exit port 125 into hose 156 which also directs the fluid to return port 104 and pump 100. This may be through a junction with hose 150, or by entering the receiving port 104 individually.

It will be noted that hoses 148, 146, 150 and 152 traverse from the front portion 12 to the rear portion 14 of the vehicle. These hoses are directed through center tube 80 of the articulation 60.

FIG. 9B depicts the flow path of pressurized hydraulic fluid for high gear. High gear eliminates the flow divider from the flow path. High gear is of course typified by travel at higher speeds where the vehicle does not need to traverse substantial obstacles. High gear has a greater flow through of fluid, without the same high demands for torque to the wheels, and therefore without the demand for divided pressurization of the fluid and also the demand for diagonal pairing. Accordingly, flow is directed in high gear first to motor 130 then to fourth motor 136, then across to third motor 134 and finally to second motor 132 before returning to the pump 100. More particularly, pressurized fluid is directed again through hose 140 into intake port 121 of six-way valve 120. Thereafter, however, the six-way valve 120 being in a second position, the fluid exits exit port 123 of the six-way valve where it proceeds along hose 158. In the depicted embodiment, hose 158 merges with hose 146 to transport fluid to first motor 130. Hose 158 may alternatively be directed independently to first motor 130. Thereafter, hose 152 directs fluid flow, as before, to the fourth motor 136. Thereafter, hose 154 directs fluid to intake port 124 of the six-way valve. The six-way valve being in the second position, this fluid is directed out of exit port 126 where upon hose 160 transports the pressurized fluid to the third motor 134, driving it. Thereafter, as before, hose 148 carries the pressurized fluid to the second motor 132 driving it. Finally, hose 150 returns the pressurized fluid from second motor 132 to receiving port 104 of pump 100.

When the hydrostatic drive system is in high gear, lines used exclusively for low gear, for example lines 142 and 144 to and from the flow divider, obtain a plenum volume of fluid that remains idle. Similarly, when in low gear, lines dedicated to use in high gear, such as lines 158 and 160 also retain idle fluid. This fluid does not interfere with the flow of fluid through the lines being used for the gear selected.

The hydrostatic drive system in the depicted embodiment shifts from low to high gear and back with a user operated manual switch on the dashboard. The switch controls the six way valve, and moves it between its first and second positions.

Steering System

The steering system of the off road vehicle relies on a novel trapped, separate and complementary fluid volume in order to coordinate four wheel steering. As indicated in FIGS. 3 and 4, a lever arm turns the vertical rods 46 and thereby turns the wheels. The lever arms 38 are connected 36 with a tie rod. A first tie rod is pivotably connected to the right rear wheel lever at a first end and is also pivotably connected to the left rear wheel lever at an equivalent pivot at the tie rod's other end. Similarly, a second tie rod with pivoting connections at both ends connects the steering levers of the two front wheels. Intermediate its two ends, each tie rod is connected to a piston rod. A front piston rod is driven a first direction, right or left in front when the steering wheel is turned, and through the steering system herein described, the rear tie rod is turned in the opposite direction left or right simultaneously.

Figure 10:
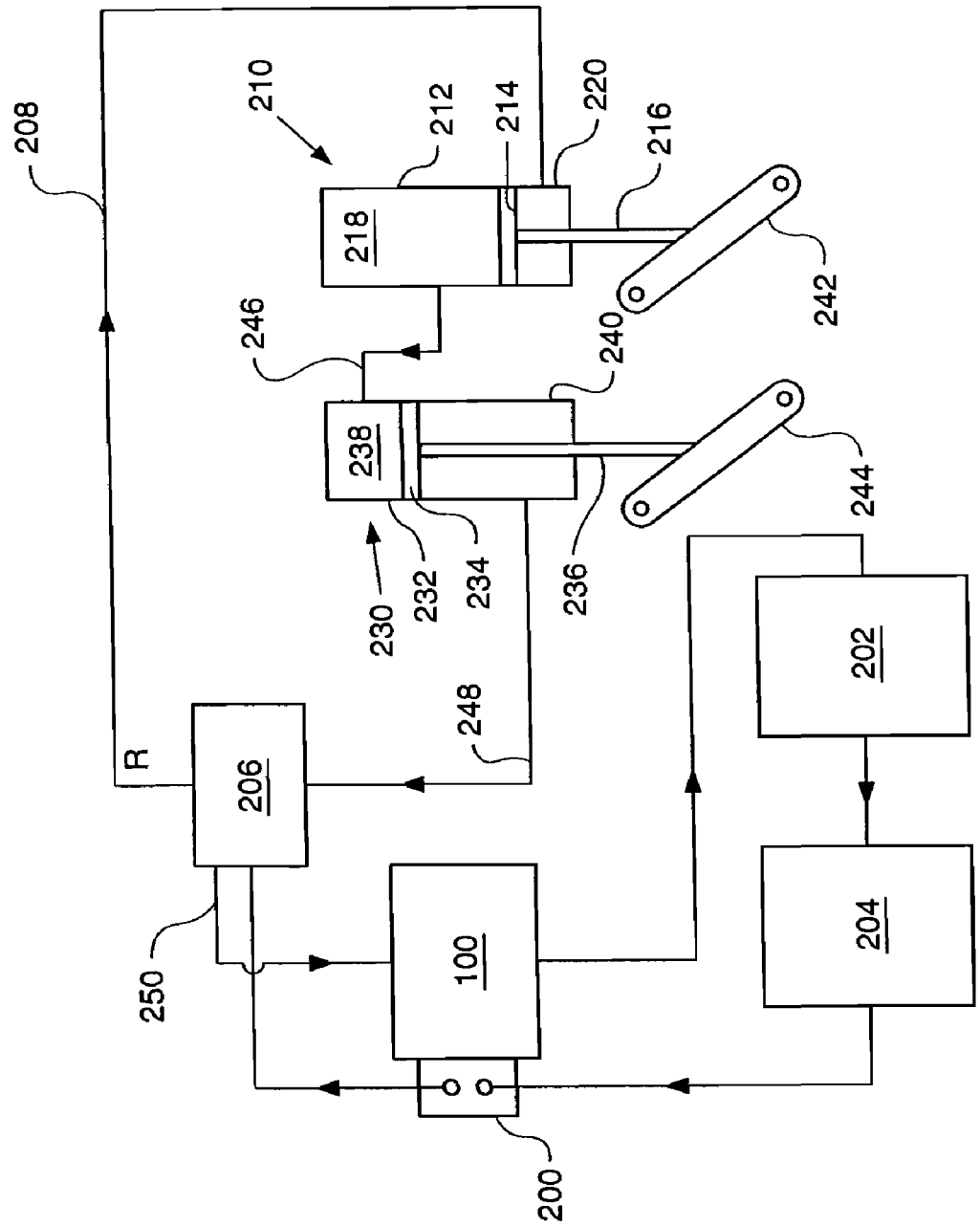
FIG. 10 is a schematic depiction of the hydrostatic steering control system.
Figure 12:
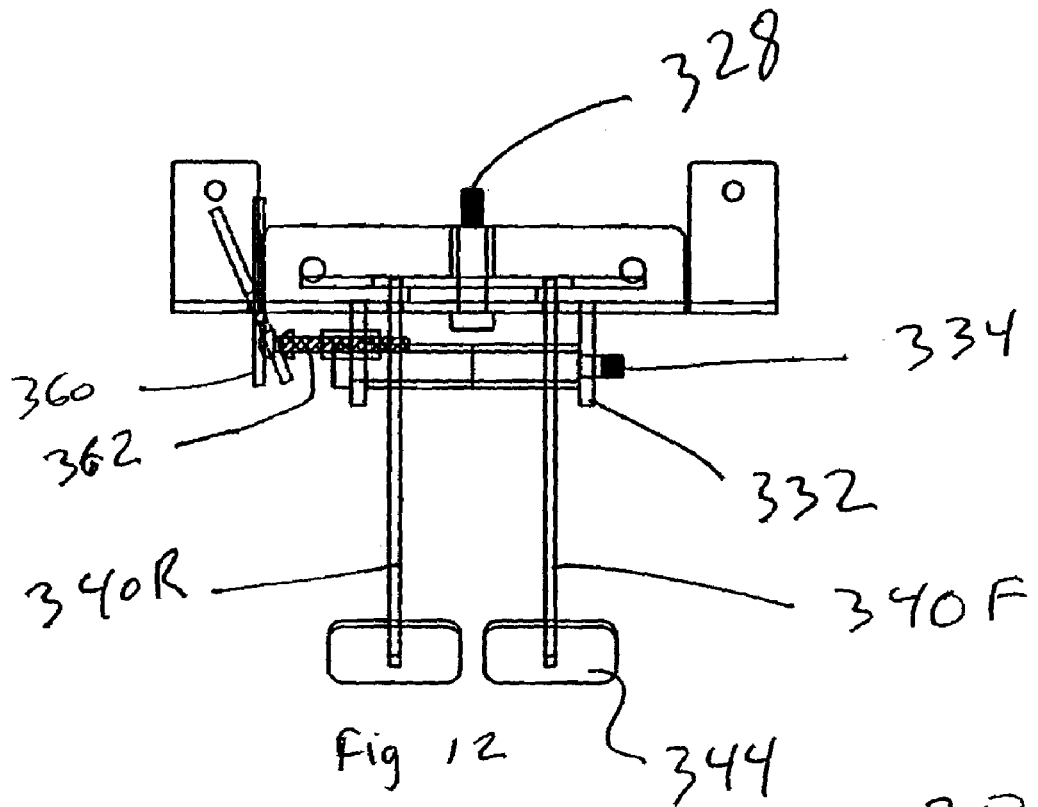
FIG. 12 is a top view of the pedal assembly.

FIG. 10 is a schematic representation of the steering system. As is commercially available, the main pump 100 includes a charge pump 200 that may also be used an implement pump. The steering system is a separate hydraulic system with a maximum pressure of 1,000 psi and a maximum flow rate of 3½ gallons per minute. For use by the steering system, the charge pump 200 withdraws fluid from the reservoir 202/cooler 204 assembly and directs it to a power steering pump/valve. In the depicted embodiment, the power steering pump/valve is a Saur Danfoss® Model OHV-25. Power steering pump/valve 206 when activated by an electrical signal received in the steering wheel that the steering wheel is being turned, directs the flow of pressurized fluid through hose 208 to a first cylinder and piston assembly 210. The assembly 210 is comprised of a cylinder 212 in which a piston 214 travels axially. A piston rod 216 is attached to the piston and exits cylinder 212 through a sealed through hole. The piston 214 defines a first piston side space 218 and second rod side space 220. Similarly, second cylinder 232 encloses a second piston 234, thereby defining a second piston side space 238 and second rod side space 240. The ends of piston rods 216 and 236 are attached to tie rods 242 and 244, which are in turn linked to the wheel turn levers 38 as previously described.

The steering system uses a separate sealed fluid volume trapped in first piston side space 218 and second piston side space 238, which are joined by hydraulic hose 246 (which also travels through the center tube 80 of the articulation 60). This trapped fluid volume will coordinate the turning of the rear wheels in a direction complementary with the turning of the front wheels, that is to say, in opposite directions.

As pressurized fluid enters the first cylinder assembly 210 from hose 208, into first rod side space 220, that space expands, driving piston 214 in a first direction, which is upwards in FIG. 10. This will of course have the effect of drawing piston rod 216 and its attached tie rod 242 in the first direction. As previously described, this will turn one pair of wheels, for example the front wheels, in a first direction. The driven and pressurized movement of piston 214 will reduce first piston side space 218 and thereby pressurize the oil in it. Since oil does not appreciably compress, this oil will escape 218 through hose 246. Thereafter the same trapped fluid will enter the second piston side space 238, and thereby pressurize it to the same extent that first rod side space 220 was pressurized. The pressurization of second piston side space 238 will drive second piston 234 in a direction opposite the travel of the first piston 214, which is downwards in FIG. 10. This of course will also drive piston rod 236 and its connected tie rod 244, thereby turning the opposite set of wheels, for example the rear wheels. As is apparent from FIG. 10, the direction of turning of the second rear set of wheels will be opposite the direction of the turning first front set of wheels. Thereby, four wheel steering is achieved and the turning radius greatly reduced, increasing the maneuverability of the off road vehicle. Finally, preexisting fluid residing in second side 240 will be exhausted into hose 248 and returned by it to power steering pump/valve 206. Finally return line 250 returns used fluid to the main pump. In order to turn the vehicle in the other direction, the power steering pump/valve 206 simply redirects the flow of fluid, so that fluid flows outwards from the pump/valve 206 into hose 248, causing the system to work in reverse.

Pedal Assembly

Control of forward and reverse motion of the off road vehicle is through a novel pedal assembly system. The hydrostatic drive is controlled by known linkages to pump 100. In the depicted embodiment, these are cables. The cables are manipulated in a novel way by pedal assembly 300, see FIGS. 11-15. The engine rpm is controlled by a hand throttle on the control panel.

The forward and reverse linkages are connected to pedal system with disc 320, and in particular at ears 322 and 324. Raising one ear engages either a forward or reverse actuation of the hydrostatic system by placing traction on the connected cable, which progresses toward the pump in a direction downwardly oriented in FIGS. 11 and 15. Raising either ear is by rotating the disc 320 about its central axis 326. Accordingly, raising one ear correspondingly lowers the opposite ear. The disc 320 is centrally mounted with a pivot pin 328 inserted through a throughhole in its central axis 326. The pin 328 is thereafter mounted on bracket 330. Bracket 330 is variously constructed for mounting on the interior of the front portion 12 of the off road vehicle. The disc 320 is rotated by selective use of one of two pedals 340F and 340R. Each of these substantially similar pedals is constructed with an arm 342 surmounted with a foot pedal 344 designed to be engaged by a user's foot. The pedal 340 turns around a pivot point 346. Radially arranged around the pivot axis 346 are a series of gear teeth 348. The teeth 348 are dimensioned to enter engaged holes 350 in disc 320 which are radially arranged around the center axis 326 of disc 320, and specially shaped for maintaining constant contact with teeth 348.

Figure 11:
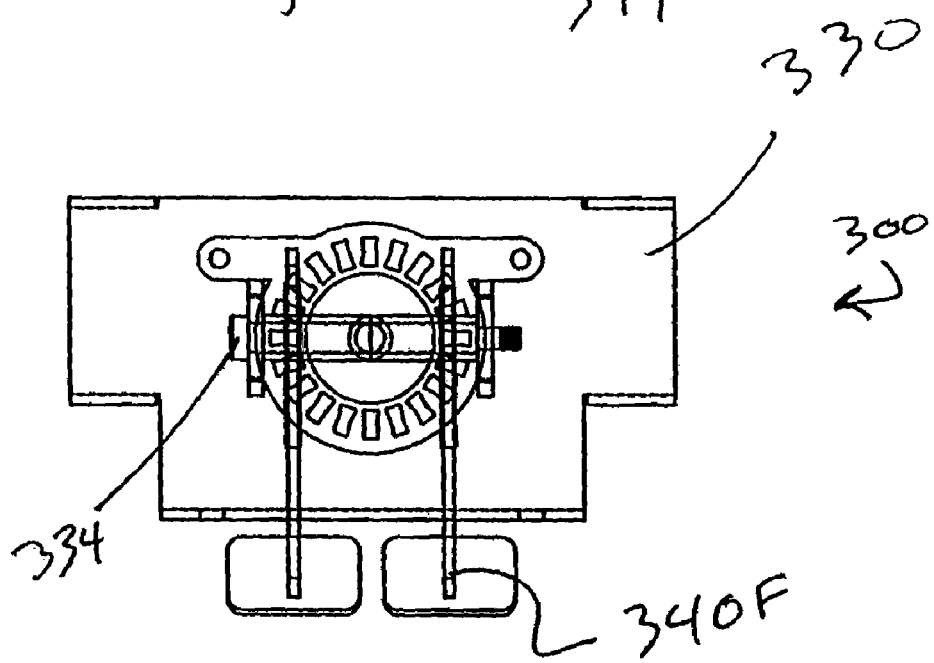
FIG. 11 is a front view of the pedal assembly.
Figure 15:
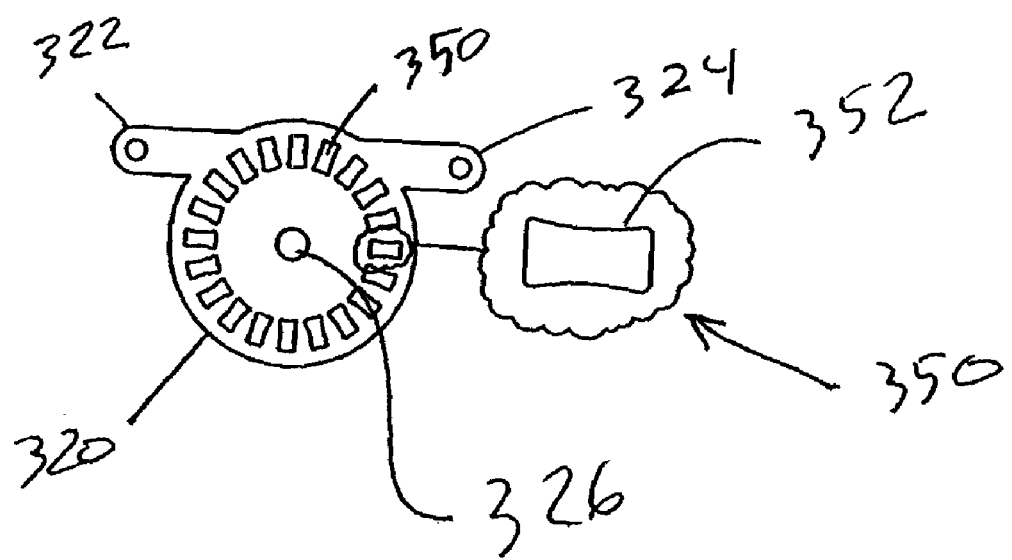
FIG. 15 is a front view of a pedal assembly actuation disc.

Each pedal 340 is assembled with the pedal assembly 300 by pivotably mounting it on a bracket extension 332 using a mounting bolt 334 (not shown). Hence, either pedal when rotating around its pivot axis 346 will consequently rotate the teeth 348. The teeth 348 being engaged with holes 350 of disc 320, moving either pedal will also turn disc 320. As is apparent from the figures, depressing right hand pedal 340F will cause disc 320 to rotate in a counterclockwise direction (as seen in FIGS. 11 and 15) thereby causing ear 324 to raise, which will apply traction to the cable attached to it, actuating forward motion. Further depression of the pedal actuates a greater degree of pressure and flow through in the hydrostatic drive systems. Since both the forward and the reverse right and left pedals 340 remain in constant engagement with holes 350 of disc 320, depressing one and rotating the disk will have the corresponding effect of raising the other pedal. This of course puts the other pedal in a raised position, to ready receive depressing force from the user's foot in order to actuate the opposite direction of travel.

An extra bracket 360 comprises a lever designed to work in conjunction with a pin 362 that inserts in hole 364 in the pedals to act as a locking pin when the vehicle is not in use to prevent inadvertent actuation of motion while the vehicle is idling.

Each hole 350 has a novel "hour glass" shape. The long sides of each hole, that is the sides that are radial to the center of the disc 320, are convex inwards. In this fashion, teeth 348 that are oblique to the rotational axis of the disc, as best seen in FIG. 13, remain in contact with the sides 352 of their corresponding holes. Thereby, a constant and smooth mechanical transition of force is achieved, producing desirable effects in terms of wear, durability and feel to the user. As can be seen in FIG. 13, in normal use one tooth 348 will be usually in substantially complete and substantially perpendicular engagement with one hole 350, while the two adjacent teeth are engaged in the two adjacent holes in a more oblique fashion.

Cooling Ports

Figure 16:
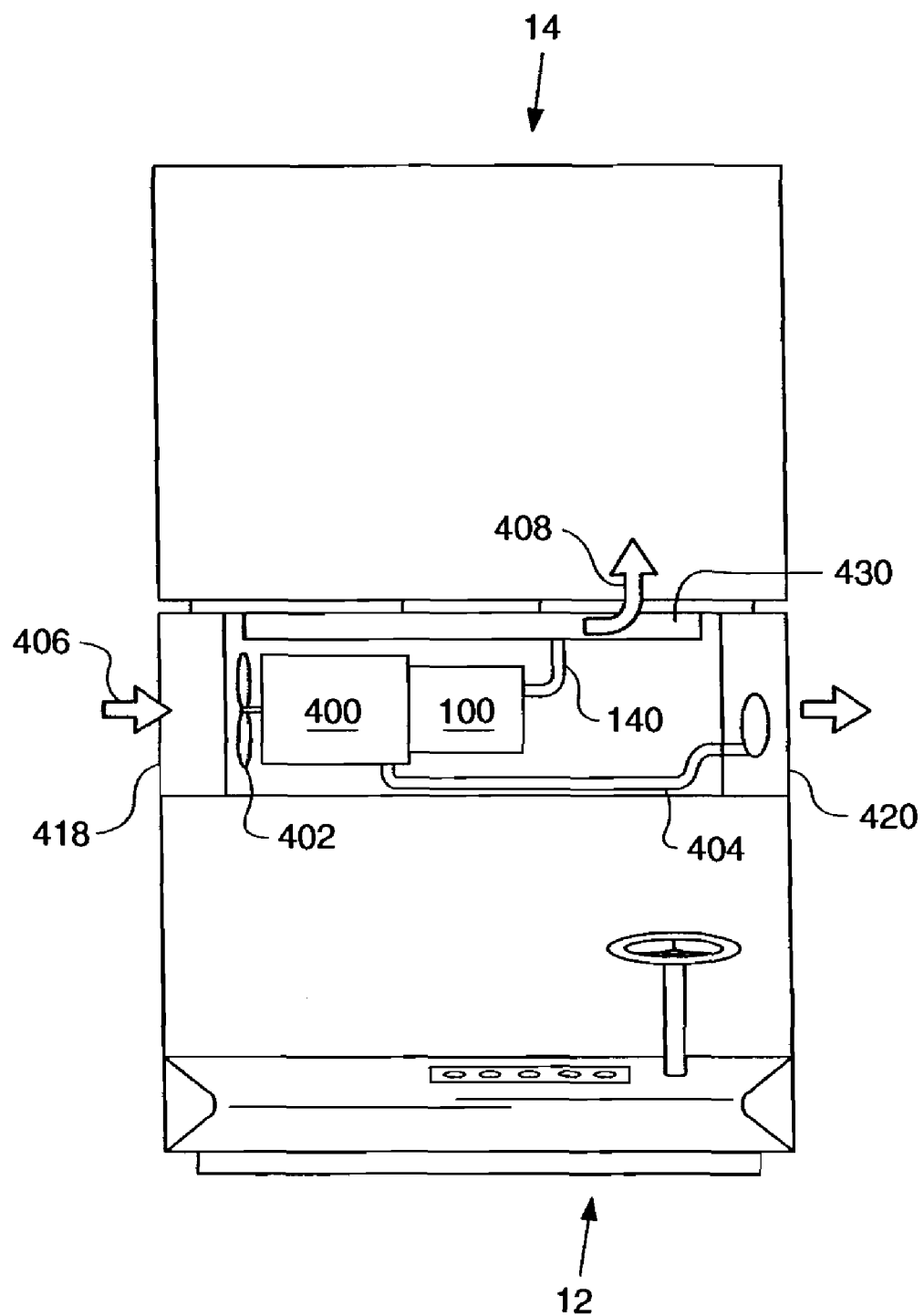
FIG. 16 is a top view of the vehicle.

The engine of the off road vehicle is an air cooled 27 hp Kohler engine. FIG. 16 is a top view of the off road vehicle. The engine and hydrostatic drive system are beneath the seats in the front portion 12 of the vehicle. In FIG. 16, the seat has been treated as if it were transparent in order to show the position of the components beneath it. Those components include the engine 400 and intake cooling fan 402. The engine is operatively connected to the pump 100 which in turn drives the hydrostatic lines, of which only one is shown, 140, for clarity. The engine has an exhaust 404 which terminates in a driver's side exhaust port 420.

In order to properly cool the engine and achieve a proper air flow over the air cooled engine, a porting system has been designed as follows. The intake 418 allows air to be drawn into the engine compartment by fan 402, as is indicated by the arrow 406. The fan 402 blows the cooling air over the engine 400 and onwards into the engine compartment. Some of the air will be released through opposing duct 420. However, this duct is also occupied by the muffler 404. Accordingly, opposing duct 420 is constricted relative to the intake duct 406. This may lead to reduced air flow and retention of heated air, creating an overheating risk in the enclosed engine compartment. Accordingly, an additional air exhaust port 430 has been fabricated into the engine compartment behind the seat used by the driver and passenger. Air exits this exhaust port 430 as indicated by the arrow 408, thereby providing adequate relief venting of heated air from the engine compartment.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A ground engaged vehicle comprising:
    a wheeled front portion;
    a wheeled rear portion;
    a hydrostatic drive system driving at least one of said wheeled front and rear portions;
    an articulation between said wheeled front portion and said wheeled rear portion, said articulation allowing said wheeled front portion and said wheeled rear portion to roll relative to one another around a longitudinal axis of the vehicle, wherein said articulation is comprised of a first collar attached to said front wheeled portion and a second collar attached to said wheeled rear portion and a center tube operatively engaged with each of said collars; and
    wherein said center tube has a sufficiently large diameter for at least one hydrostatic drive hose to travel between said wheeled front portion and said wheeled rear portion;
    two wheels on said front portion are connected to each other by a front tie rod, said front tie rod having a first end and a second end, each of said first and said second ends of said front tie rod being pivotably attached to a front lever arm, each of said lever arms being operatively engaged to turn each of said two wheels of said front portion, said front tie rod being driven by a front two way piston and cylinder assembly;
    two wheels on said rear portion are connected to each other by a rear tie rod, said rear tie rod having a first end and a second end, each of said first and said second ends of said rear tie rod being pivotably attached to a rear lever arm, each of said lever arms being operatively engaged to turn each of said two wheels of said rear portion, said rear tie rod being driven by a rear two way piston and cylinder assembly;
    each of said front and rear two way cylinder and piston assemblies having an active chamber, one of said active chambers receiving pressurized fluid from said power steering system while the other of said front or rear active portions exhausts fluid to return to said power steering system;
    each of said front and rear piston and cylinder assemblies having a passive portion each of said front and rear passive portions being connected by a hydrostatic hose, and said first and second passive portions and said hose being in operative communication to trap a volume of fluid such that pressurization of a first active portion of a first piston cylinder assembly drives said trapped fluid volume into said second passive portion of said second piston cylinder assembly such that when a first piston cylinder assembly is driven to turn a first pair of wheels in a first direction, said second piston cylinder assembly is driven to drive a second pair of wheels in an opposite direction.

2. The vehicle of claim 1 wherein further comprising a power steering system driven through a charge pump.

3. The vehicle of claim 1 further comprising said operative engagement between said center tube and said collars being threaded;
    said threads being truncated such that a space is defined to receive grease whereby a seal may be maintained.

4. The vehicle of claim 1 wherein said wheels on said front portion are steerable by a front steering linkage and said second wheels on said rear portion are steerable by a rear steering linkage; wherein said front steering linkage and said rear steering linkage are coordinated by a hydrostatic powering steering system.

5. A ground engaged vehicle comprising:
    a wheeled front portion;
    a wheeled rear portion;
    a hydrostatic drive system driving at least one of said wheeled front and rear portions;
    an articulation between said wheeled front portion and said wheeled rear portion, said articulation allowing said wheeled front portion and said wheeled rear portion to roll relative to one another around a longitudinal axis of the vehicle, wherein said articulation is comprised of a first collar attached to said front wheeled portion and a second collar attached to said wheeled rear portion and a center tube operatively engaged with each of said collars; and wherein said center tube has a sufficiently large diameter for at least one hydrostatic drive hose to travel between said wheeled front portion and said wheeled rear portion said hydrostatic drive system further comprises:
a single engine;
a single pump;
four hydrostatic motors, each of said hydrostatic motors being operatively engaged to drive each of four wheels, two of said hydrostatic motors and said wheels being on said front portion and two of said hydrostatic motors and said wheels being on said rear portion;
a flow divider;
a valve assembly;
said engine, said pump, said flow divider, said valve assembly and said hydrostatic motors being in operative communication such that when said vehicle is in a high gear, said flow divider is disengaged such that an undivided hydrostatic fluid volume drives all four wheels and when said vehicle is in a low gear, said flow divider is engaged such that a first divided hydrostatic fluid volume drives a first diagonal pair of said wheels and a second divided hydrostatic fluid volume drives to a second diagonal pair of said wheels.

6. The vehicle of claim 5 further comprising said pump maintaining a first fluid pressure when said vehicle is in said low gear and said pump maintaining a second fluid pressure when said vehicle is in said high gear, said second pressure being lower than said first pressure.

7. The vehicle of claim 5 further comprising said pump maintaining a first fluid flow rate when said vehicle is in said high gear and a second fluid flow rate when said vehicle is in said low gear, said second fluid flow rate being lower than said first fluid flow rate.

8. The vehicle of claim 5 wherein said valve assembly is a six-way valve assembly, further comprising four output ports and two input ports.

9. The vehicle of claim 5 wherein said valve assembly is two three-way valves, each of said three-way valves having two output ports and one input port.

10. The vehicle of claim 5 wherein said wheels on said front portion are steerable by a front steering linkage and said second wheels on said rear portion are steerable by a rear steering linkage; wherein said front steering linkage and said rear steering linkage are coordinated by a hydrostatic powering steering system.

11. A ground engaged vehicle comprising:
a front portion having two wheels;
a rear portion having two wheels;
a hydrostatic drive system driving said wheels of said front and rear portions;
an articulation between said front portion and said rear portion, said articulation allowing said front portion and said rear portion to roll relative to one another around a longitudinal axis of the vehicle;
said hydrostatic drive system further comprising;
a single engine being mounted in one of said front portion or said rear portion;
a pump;
four hydrostatic motors, each of said hydrostatic motors being operatively engaged to drive one of said wheels;
a flow divider;
a valve assembly;
said engine, said pump, said flow divider, said valve assembly and said hydrostatic motors being in operative communication such that when said vehicle is in a high gear, said flow divider is disengaged such that an undivided hydrostatic fluid volume drives all four wheels and when said vehicle is in a low gear, said flow divider is engaged such that a first divided hydrostatic fluid volume drives a first diagonal pair of said wheels and a second divided hydrostatic fluid volume drives to a second diagonal pair of said wheels.

12. The vehicle of claim 11 wherein said wheels on said front portion are steerable by a front steering linkage and said second wheels on said rear portion are steerable by a rear steering linkage; wherein said front steering linkage and said rear steering linkage are coordinated by a hydrostatic powering steering system.

13. A ground engaged vehicle comprising:
a front portion having a first pair of wheels;
a rear portion having a second pair of wheels;
a hydrostatic drive system driving said wheels of said front and rear portions;
an articulation between said front portion and said rear portion, said articulation allowing said front portion and said rear portion to roll relative to one another around a longitudinal axis of the vehicle;
wherein said two wheels on said front portion are connected to each other by a front tie rod, said front tie rod having a first end and second end, each of said first and second ends of said front tie rod being pivotably attached to a front lever arm, each of said lever arms being operatively engaged to turn each of said two wheels of said front portion, said front tie rod being driven by a front two way piston and cylinder assembly;
said two wheels on said rear portion are connected to each other by a rear tie rod, said rear tie rod having a first end and second end, each of said first and second ends of said rear tie rod being pivotably attached to a front lever arm, each of said lever arms being operatively engaged to turn each of said two wheels of said rear portion, said rear tie rod being driven by a rear two way piston and cylinder assembly;
each of said front and rear two way cylinder and piston assemblies having an active chamber, one of said active chambers receiving pressurized fluid from said power steering system while the other of said front or rear active portions exhausts fluid to return to said power steering system;
each of said front and rear piston and cylinder assemblies having a passive portion each of said front and rear passive portions being connected by a hydrostatic hose, and said first and second passive portions and said hose being in operative communication to trap a volume of fluid such that pressurization of a first active portion of a first piston cylinder assembly drives said trapped fluid volume into said second passive portion of said second piston cylinder assembly such that when a first piston cylinder assembly is driven to turn a first pair of wheels in a first direction, said second piston cylinder assembly is driven to drive a second pair of wheels in an opposite direction.

14. The vehicle of claim 13 wherein said wheels on said front portion are steerable by a front steering linkage and said second wheels on said rear portion are steerable by a rear steering linkage; wherein said front steering linkage and said rear steering linkage are coordinated by a hydrostatic powering steering system.

* * * * *

UNITED STATES PATENT AND TRADEMARK OFFICE
CERTIFICATE OF CORRECTION

PATENT NO. : 7,793,742 B2  
APPLICATION NO. : 12/027054  
DATED : September 14, 2010  
INVENTOR(S) : David Donaldson Page 1 of 1

It is certified that error appears in the above-identified patent and that said Letters Patent is hereby corrected as shown below:

Title Page, Item (73) Assignee should read  
-- (73)Assignee: Coot2, Inc. --.

Signed and Sealed this

Twenty-third Day of November, 2010

David J. Kappos  
*Director of the United States Patent and Trademark Office*